Patented Nov. 30, 1937

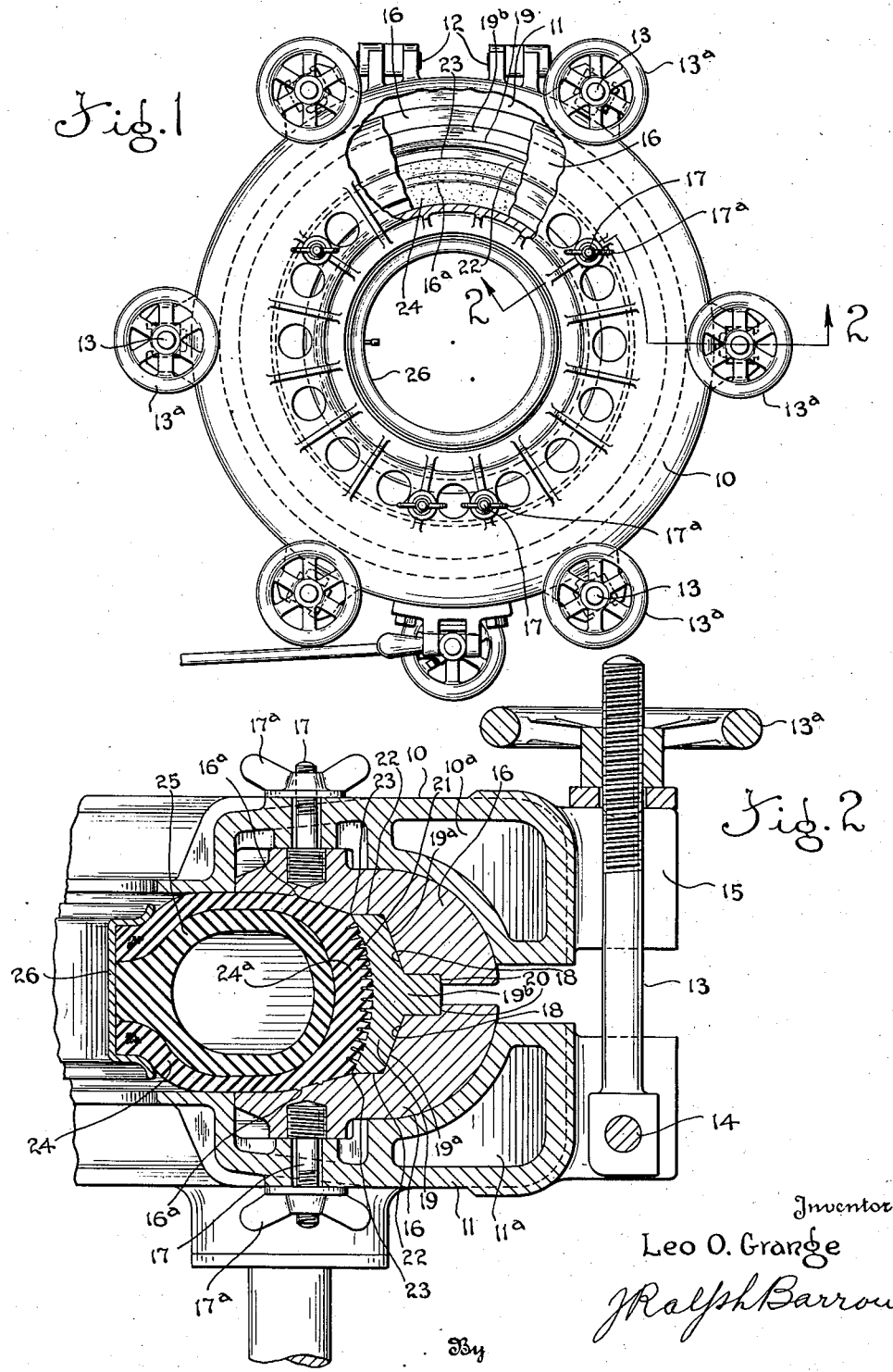

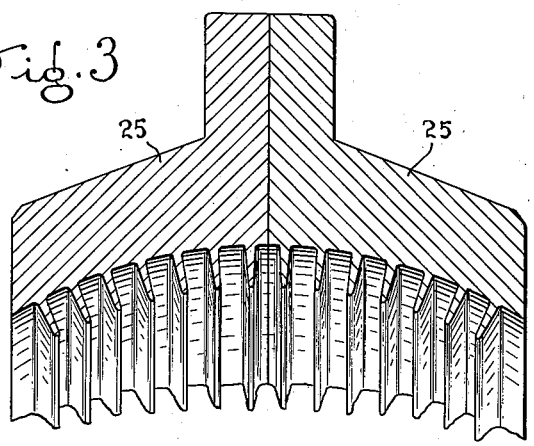
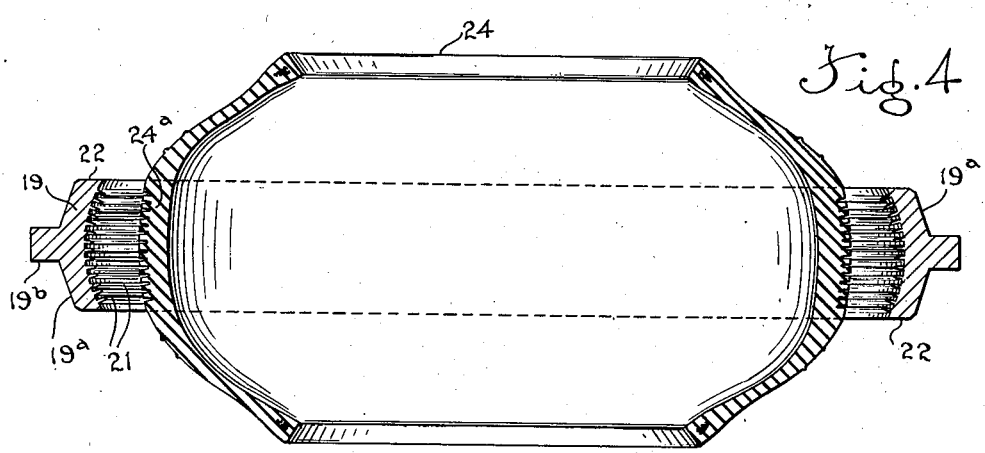
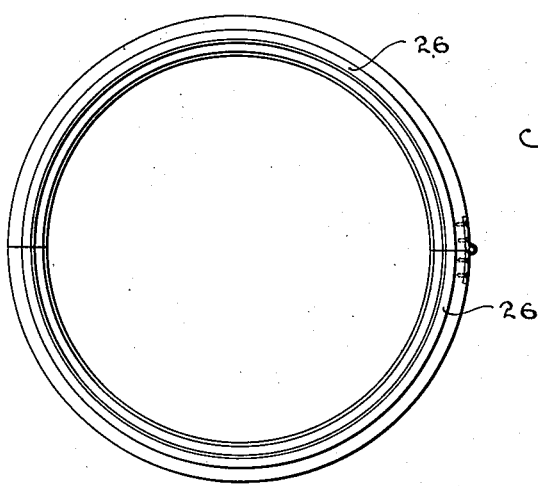

2,100,478

UNITED STATES PATENT OFFICE 2,100,478

FULL-CIRCLE TIRE RETREADING VULCANIZER

Leo O. Grange, Chicago, Ill., assignor to Safety Vulcanizer Company, Chicago, Ill., a corporation of Illinois Application September 26, 1936, Serial No. 102,772

2 Claims. (Cl. 18—18)

This invention relates to full-circle tire retreading vulcanizers.

The general purpose of the present invention is to provide an improved full-circle tire-retreading vulcanizer.

Heretofore, full-circle tire retreading vulcanizers have been provided comprising cooperating annular vulcanizer sections adapted to be heated in any suitable way and each removably and replaceably receiving matrices of various sizes and designs for retreading tires of various sizes and designs. In the use of vulcanizers of this type, however, considerable difficulty has been experienced in the removal of the retreaded tires from the mold and in many cases, particularly with certain tread designs requiring more or less thin-walled molding projections, the molding projections become broken in prying the tire out of the mold.

The present invention has for its object the provision of a full-circle tire retreader in which the vulcanizer sections removably and replaceably carry side wall matrices which are so formed as to removably receive and retain therein in tread molding and vulcanizing position a removable and replaceable tread matrix engageable only with the periphery of the tire and consequently separable from the tire radially after the tire has been removed from the vulcanizer so that the non-skid projections on the tread matrix are radially withdrawn from the corresponding depressions formed in the tire.

The foregoing and other purposes or objects of the invention are attained in the tire retreading vulcanizer illustrated in the accompanying drawings and described below. It is to be understood that the invention is not limited to the specific forms thereof shown and described.

Of the accompanying drawings.

Figure 1 is a plan view partly broken away and in section of a tire retreader embodying the invention.

Figure 2 is a radial section along line 2—2 of Figure 1.

Figure 3 is a radial section through a modified form of tread matrix embodying the invention.

Figure 4 is a diametral sectional elevation showing a retreaded tire being removed from the tread matrix.

Figure 5 is an elevation of a modified form of tread ring or matrix.

Referring to the drawings, the numerals 10 and 11 designate vulcanizer sections of a known type which may be hinged together at 12 and arranged to be releasably clamped in closed position as shown by clamps 13, 13 pivoted at 14, 14 on section 11 and engageable in radial slots 15, 15 in section 10, the clamps 13 having clamping members 13ª threaded thereon to draw the vulcanizer sections together.

Sections 10 and 11 may be chambered as at 10ª and 11ª for circulation of a heated fluid about the tread portion of a tire to be retreaded therein. Removable and replaceable matrices 16, 16 which may comprise annular rings are arranged to fit into suitable annular cavities in the inner faces of the vulcanizer section and to be replaceably secured therein as by means of screws 17, 17 and nuts 17ª, 17ª the screws being extended through the walls of the vulcanizer sections 10 and 11.

The matrices 16 are furnished in various sizes and with various side wall designs on the inner faces thereof as indicated at 16ª, 16ª and are formed with inwardly tapered surfaces at 18, 18 for embracing and positioning a removable tread matrix 19 formed with correspondingly tapered outer peripheral surfaces as at 19ª, 19ª. The ring 19 preferably has thereon a radial web 19ᵇ for extending between and being clamped by the matrices 16, 16 which are preferably formed with shoulders as at 20, 20 which in cooperation with the engaging surfaces 18 and 19ª and with the outer periphery of the web 19ᵇ serve to center the tread ring radially in proper relation to the tread of a tire to be repaired. The ring 19 has any desired tread molding projections at 21 on its inner periphery and at its edges the tread ring fits against the sides of the matrices 16 as shown at 22, 22 so that the junctions of the tread and side wall molding surfaces of the retreader are at 23, 23 at the outer periphery of the shoulders of the tire being retreaded.

A tire 24 is shown being retreaded in the mold at 24ª and is supported on a pressure bag 25 under internal pressure during the retread vulcanizing operation as will be understood, the assembled tire and pressure bag being mounted on a rim 26.

In the use of a retreader, the tire to which the new unvulcanized tread rubber has been applied is mounted with the pressure bag on the rim 26 and assembled with the tread ring about the same and inserted in one vulcanizer section while sections are swung apart, the other vulcanizer section is swung into position and secured by the clamps 13 and the tire vulcanized at the required temperature for the required period of time under the pressure of the pressure bag and under heat applied to the chambers 10ª and 11ª of the vulcanizer.

The ring 19 may be one piece and continuous as shown in Figures 1, 2 and 4 and the tire pressure-bag and rim assembly after the vulcanization may be separated from the side-wall matrices 16 upon opening the vulcanizer and removed with the tread molding matrix, this operation being accomplished with ease by axial movement of the sides of tire away from the side faces of the matrices 16, there being no under-cut rubber formations tending to resist such separation. This type of tread ring avoids the presence of a flash on any part of the tread of the finished tire.

Thereafter, the rim and pressure bag may be removed from the tire and the tire separated from the inner periphery of the tread matrix by spreading the beads of the tire as shown in Figure 4 and consequently reducing its outer periphery. This serves substantially radially to withdraw the tread molding projections 21 from the corresponding recesses formed by them in the tread of the tire.

To facilitate removal of the tread matrix it may be constructed in two annular cooperating pieces or rings as shown at 25, 25 in Figure 3 or in two or more arcuate sections 26, 26 which may or may not be hingedly connected as shown in Figure 5.

In all of the forms of tread rings shown the tread matrix may be separated radially from the outer periphery of the tire either by pulling the tread of the tire inwardly or pulling the tread matrix (Figure 5) outwardly. All forms of the tread rings embrace only the periphery of the tire between the peripheral edges of the shoulders at 23, 23 and consequently may be separated from the tire with comparative ease. Various side wall and tread matrices may be used in combination to produce any desired combination of tread and side wall formations and to adapt a single vulcanizer to retread tires of different sizes and profiles.

Modifications of the invention other than those disclosed herein may be resorted to without departing from the spirit thereof or the scope of the appended claims.

What is claimed is:

1. In a tire retreading vulcanizer cooperating annular vulcanizer sections, means for clamping said sections together, removable and replaceable annular side wall matrices, means for removably securing said matrices to the inner faces of the vulcanizer sections, and an annular removable tread matrix, said side wall matrices and said tread matrix having cooperating surfaces for clamping the tread matrix between the secured side wall matrices in tread molding position when the vulcanizer is closed, said side wall matrices having surfaces for molding only the sides of the tire from the outer periphery of the shoulder portions of the tire and from which the tire is axially separable and having portions embracing peripherally said tread matrix to position the latter in the vulcanizer, said tread matrix having formations thereon for forming recesses in the tire and engaged with the tire only between said outer peripheries of the said shoulder portions, said tread molding matrix being removable from the vulcanizer with the vulcanized tire and radially separable from the periphery of the tire.

2. A tire retread vulcanizer comprising two annular vulcanizer sections, annular side wall matrices, means for removably securing said side wall matrices to the inner faces of said vulcanizer sections, and an annular tread matrix, said tread matrix being constructed to be removably clamped between the removable side wall matrices and said side wall matrices being constructed removably to embrace peripherally and to clamp said tread matrix in the vulcanizer whereby one vulcanizer is adapted to retread tires of different tread and side-wall formations or combinations thereof and of different sizes and profiles by removing and replacing the side wall and tread matrices as required or desired.

LEO O. GRANGE.